(12) United States Patent
Williams et al.

(10) Patent No.: US 12,554,451 B2
(45) Date of Patent: Feb. 17, 2026

(54) DISPLAY DEVICES FOCUS INDICATORS

(71) Applicant: Hewlett-Packard Development Company, L.P., Spring, TX (US)

(72) Inventors: Alexander Morgan Williams, Spring, TX (US); Anthony Kaplanis, Spring, TX (US); Gregory Staten, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/845,673

(22) PCT Filed: Mar. 11, 2022

(86) PCT No.: PCT/US2022/020019
§ 371 (c)(1),
(2) Date: Sep. 10, 2024

(87) PCT Pub. No.: WO2023/172272
PCT Pub. Date: Sep. 14, 2023

(65) Prior Publication Data
US 2025/0208814 A1 Jun. 26, 2025

(51) Int. Cl.
*G06F 3/14* (2006.01)
*G06F 3/01* (2006.01)
*G06T 7/50* (2017.01)

(52) U.S. Cl.
CPC ............ *G06F 3/1423* (2013.01); *G06F 3/012* (2013.01); *G06F 3/013* (2013.01); *G06T 7/50* (2017.01); *G06T 2207/30201* (2013.01)

(58) Field of Classification Search
CPC ........ G06F 3/013; G06F 3/1423; G06F 3/012; G06F 3/14; G06F 3/1454; G06F 3/0304; G06F 3/147; G06F 3/1446; G06F 3/0227; G09G 2354/00; G09G 5/14; G09G 5/12; G09G 2330/021; G09G 2356/00; G09G 2360/04; G09G 2370/06; G09G 2370/08; G09G 2370/24
See application file for complete search history.

(56) References Cited

U.S. PATENT DOCUMENTS

| 11,836,328 | B1* | 12/2023 | Olliphant | G06V 40/20 |
| 2012/0272179 | A1 | 10/2012 | Stafford | |
| 2015/0153827 | A1* | 6/2015 | Yun | G06F 3/038 |
| | | | | 345/156 |
| 2020/0133389 | A1* | 4/2020 | Chiu | G06F 3/012 |
| 2020/0168176 | A1 | 5/2020 | Chen et al. | |

FOREIGN PATENT DOCUMENTS

| EP | 2551763 A1 | 1/2013 | |
| EP | 3605314 A1 * | 2/2020 | G06F 3/012 |
| WO | 2016/175825 A1 | 11/2016 | |

* cited by examiner

*Primary Examiner* — Koosha Sharifi-Tafreshi
(74) *Attorney, Agent, or Firm* — Quarles & Brady LLP

(57) ABSTRACT

In some examples, an electronic device includes a first display device including a first sensor and a second display device including a second sensor and a controller to, in response to a detection of a user presence via the first sensor, cause the first display device to display a focus indicator, and in response to a detection of the user presence via the second sensor, cause the second display device to display the focus indicator.

20 Claims, 7 Drawing Sheets

DISPLAY DEVICES FOCUS INDICATORS

BACKGROUND

Electronic devices such as desktops, laptops, notebooks, tablets, and smartphones are able to couple to multiple display devices. Coupling to multiple display devices increases an overall display area of an electronic device. The increased overall display area enables a user to perform multiple tasks or to dedicate specified portions of the overall display area for different tasks, for instance.

BRIEF DESCRIPTION OF THE DRAWINGS

Various examples are described below referring to the following figures.

DETAILED DESCRIPTION

Figure 1:
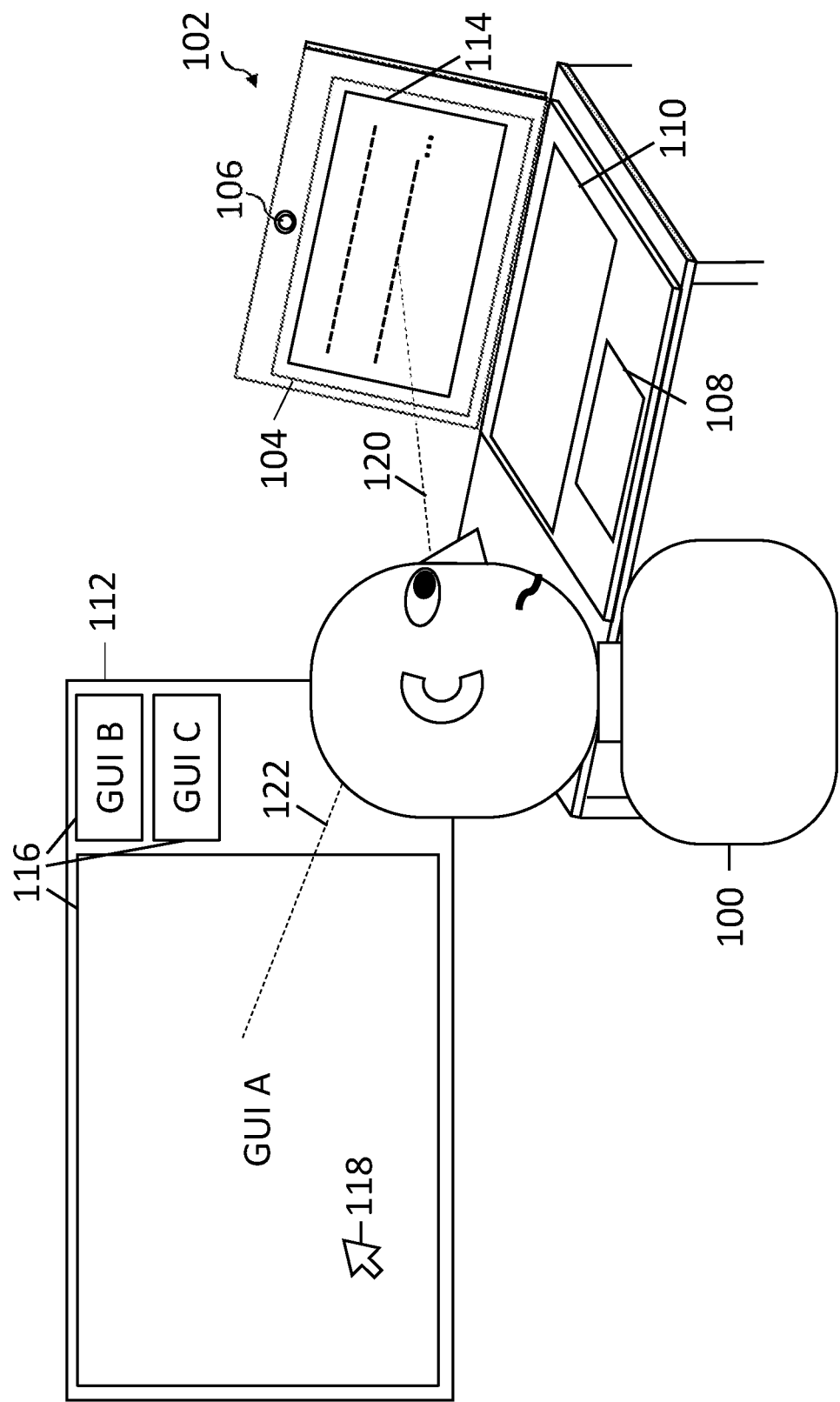
FIG. 1 is a block diagram of an electronic device for adjusting a display of a focus indicator on display devices, in accordance with various examples.

As described above, electronic devices include multiple display devices to increase an overall display area of the electronic devices and enhance usability of the electronic devices. A user may locate the multiple display devices in multiple locations. For instance, a first display device and a second display device are located on a first side of a room and a third display device is located on a second side of the room. When the user moves from one display device to another display device, the user may lose track of which display device of the multiple display devices displays a focus indicator. The focus indicator, as used herein, identifies a display device of the multiple display devices that is affected by input from an input device. Based on the multiple locations of the multiple display devices, the user may lose track of which display device of the multiple display devices includes the focus indicator without returning to a previous location.

In some instances, when the user moves from one display device to another display device, the user manually switches the input device from an input device associated with a previous display device to another input device associated with a current display device. However, switching the input device does not switch a location of the focus indicator. In other instances, when the user moves from one display device to another display device, the user attempts to utilize a current input device to adjust the location of the focus indicator. A display configuration of the electronic device may block the focus indicator from moving in certain directions. The display configuration, as used herein, indicates an order of priority for the multiple display devices to display information, where the order of priority is independent of a physical positioning relationship between the multiple display devices. For instance, in response to a user selecting an icon for a graphical user interface (GUI) for an application, the GUI for the application opens on a display device of the multiple display devices displays that has the highest priority. Without knowledge of the display configuration, the user cannot navigate the multiple display devices without encountering barriers to movement of the focus indicator.

This description describes an electronic device that detects a user presence in proximity to a display device of multiple display devices. The electronic device detects the user presence via a sensor, an input device, or a combination thereof, for example. In response to detecting the user presence, the electronic device determines whether the user intends to use the display device. In some examples, the electronic device uses a distance, a user gaze, a user profile, or a combination thereof, to determine whether the user intends to use the display device. In some examples, the determination of the user intent to use the display device is made after a threshold amount of time during which the user presence remains in proximity to the display device of the multiple display devices.

In response to the electronic device determining that the user intends to use the particular display device, the electronic device causes the particular display device to display the focus indicator. Displaying the focus indicator includes causing the display device to display a cursor, a pointer of an input device, an active GUI from another display device, a working area of another display device, or a combination thereof, for example. The active GUI, as used herein, is a GUI of an executing application. Other GUIs that are executing in a background are referred to herein as background GUIs. The working area, as used herein, includes the active GUI, the background GUIs, or a combination thereof. In some examples, the electronic device enables an input device associated with the display device displaying the focus indicator, adjusts settings of the display device displaying the focus indicator, adjusts settings of another display device of the multiple display devices, or a combination thereof. Enabling the input device associated with the display device enables a user to interact with the focus indicator via the input device, for example.

The electronic device adjusting the focus indicator between multiple display devices in response to an indication that the user intends to use a particular display device enables the user to move between the multiple display devices without tracking the focus indicator. By adjusting the input device, which display device of the multiple display devices displays the focus indicator, settings of the display device including the focus indicator, settings of another display device of the multiple display devices, or the combination thereof, in response to user intent, the electronic device enhances the user experience. In some examples, adjusting the settings of the another display device reduces power consumption of the electronic device. In other examples, adjusting the settings of the another display device reallocates resources to enhance activities associated with the display device including the focus indicator.

In some examples in accordance with the present description, an electronic device is provided. The electronic device includes a first display device including a first sensor and a second display device including a second sensor, and a controller to, in response to a detection of a user presence via the first sensor, cause the first display device to display a focus indicator, and in response to a detection of the user presence via the second sensor, cause the second display device to display the focus indicator.

In other examples in accordance with the present description, a method is provided. The method includes detecting a user presence via a sensor associated with multiple display devices, determining that a display device of the multiple display devices is closest in proximity to the user presence, and causing the display device that is closest in proximity to the user presence to display a focus indicator.

In some examples in accordance with the present description, a non-transitory machine-readable medium storing machine-readable instructions is provided. The term "non-transitory," as used herein, does not encompass transitory propagating signals. The non-transitory machine-readable medium stores machine-readable instructions, which, when executed by a controller, cause the controller to detect a user presence and determine whether a first distance between the user presence and a first display device is less than a second distance between the user presence and a second display device. In response to a determination that the first distance is less than the second distance, the machine-readable instructions, when executed by the controller, cause the controller to cause the first display device to display a focus indicator. In response to a determination that the second distance is less than the first distance, the machine-readable instructions, when executed by the controller, cause the controller to cause the second display device to display the focus indicator.

Referring now to FIG. 1, a block diagram of an electronic device 102 for adjusting display of a focus indicator 118 on display devices 104, 112 is shown, in accordance with various examples. The electronic device 102 is a desktop, laptop, notebook, tablet, smartphone, or other suitable computing device that couples to multiple display devices, for example. The focus indicator 118 is a pointer of an input device, for example. The electronic device 102 includes display devices 104, 112, a sensor 106, and input devices 108, 110. The display devices 104, 112 are any suitable devices for displaying data of the electronic device 102. The display devices 104, 112 are liquid crystal displays (LCDs), light-emitting diode (LED) displays, plasma displays, quantum dot (QD) displays, or a combination thereof, for example. A display device 104 is referred to as an integrated display device because the display device 104 is disposed within a chassis of the electronic device 102, for example. The display device 104 displays a GUI 114. A display device 112 is referred to as a standalone display device, for example. The display device 112 displays GUIs 116 and the focus indicator 118. The sensor 106 is an infrared (IR) sensor, a proximity sensor, an ultrasonic sensor, or an image sensor, for example. The input devices 108, 110 are any suitable devices for inputting data into the electronic device 102. An input device 108 is a touchpad, for example. An input device 110 is a keyboard, for example.

While not explicitly shown, in some examples, the electronic device 102 includes network interfaces, video adapters, sound cards, local buses, peripheral devices (e.g., a mouse, a speaker, a microphone, a drawing tablet), or a combination thereof. While the sensor 106 is shown as an integrated sensor of the electronic device 102, in other examples, the sensor 106 couples to any suitable connection for enabling communications between the electronic device 102 and the sensor 106. The connection may be via a wired connection (e.g., a Universal Serial Bus (USB)) or via a wireless connection (e.g., BLUETOOTH®, Wi-Fi®). The display device 112 may couple to the electronic device 102 via a wired (e.g., USB, a High-Definition Multimedia Interface (HDMI) connector, a Video Graphics Array (VGA) connector, a Digital Visual Interface (DVI)) or via a wireless connection (e.g., BLUETOOTH®, Wi-Fi®).

As described above, the electronic device 102 detects the user 100 in proximity to the display devices 104, 112. The electronic device 102 detects the user 100 via the sensor 106, for example. In another example, the electronic device 102 utilizes the sensor 106 to detect the user 100 in proximity to the display device 104 and utilizes another sensor (not explicitly shown) to detect the user 100 in proximity to the display device 112. The another sensor is an integrated sensor (not explicitly shown) of the display device 112, for example. In response to the electronic device 102 determining that the user 100 intends to use a particular display device of the display devices 104, 112, the electronic device 102 causes the particular display device to display the focus indicator 118.

In various examples, the electronic device 102 determines that a user presence indicates that the display device 112 of the display devices 104, 112 is intended to be used by the user 100 by comparing a coordinate of peaks of signals received via the sensor 106 to coordinates that indicate reference points of the display devices 104, 112. For example, the sensor 106 is a presence sensor that generates a pulse that is reflected from objects in a path of the pulse. The reflected pulse includes a spike, or a peak, at an x-axis coordinate in response to the pulse encountering an object at that coordinate. A reference point of the display device 104, 112 is a point where a vertical axis and a horizontal axis bisect the display device 104, 112 or a point where an optical axis of a sensor (e.g., the sensor 106) of the display device 104, 112 intersects the user 100, for example. The optical axis, as used herein, is an imaginary line along which there is a degree of rotational symmetry in the sensor. In response to the determination that the display device 112 is intended to be used by the user 100, the electronic device 102 causes the display device 112 to display the focus indicator 118.

In some examples, the electronic device 102 uses a distance between the user 100 and the display device 104, 112, respectively, an angle of an eye gaze of the user 100 relative to the display device 104, 112, respectively, a profile of the user 100 relative to the display device 104, 112, respectively, or a combination thereof, to determine whether the user 100 intends to use the display device 104, 112, respectively. The eye gaze of the user 100 is referred to as the user gaze. The profile of the user 100 is referred to as the user profile. The user profile indicates a percentage of the user face that is viewable. The user profile is a quarter profile, a half profile, a three-quarters profile, a full view, or other fractional view of the face of the user 100, for example. The user reference 120 indicates the distance between the user 100 and the display device 104, an angle of the user gaze relative to the display device 104, a user profile relative to the display device 104, or a combination thereof, for example. The user reference 122 indicates the distance between the user 100 and the display device 112, an angle of the user gaze relative to the display device 112, a user profile relative to the display device 112, or a combination thereof, for example.

In various examples, the electronic device 102 determines the distance between the user 100 and the display device 104, 112 based on a duration of time from an emission of a signal by the sensor 106 to receipt of a return signal. The signal and the return signal are comprised of photons, for example. In another example, the electronic device 102 determines the distance to the user 100 by comparing a size of the user within an image relative to fixed images of a background of the image. In yet another example, the electronic device 102 determines the distance to the user 100 by utilizing a proportional relationship between facial features and a characteristic such as focal length of the sensor 106.

In some examples, to determine the angle of the user gaze, the user profile, or a combination thereof, relative to the display device 104, 112, the electronic device 102 determines a reference point of the display device 104, 112. The electronic device 102 determines an angle between the user gaze and the reference point, in some examples. In other examples, to determine the user profile, the electronic device 102 determines an angle between a central vertical axis of a face of the user 100 and the reference point. The central vertical axis, as used herein, is an imaginary line that bisects facial features of the user 100 from a center of the forehead, through the nose, mouth, and chin.

In various examples, to identify the user gaze, the user profile, or a combination thereof, the electronic device 102 detects facial features of the user 100 utilizing facial detection techniques. For example, the electronic device 102 decomposes an image captured via an image sensor. The image sensor is the sensor 106, for example. The electronic device 102 decomposes the frame utilizing a pre-processing technique, in some examples. Decomposing, as used herein, reduces objects to edge-like structures. The pre-processing techniques include grayscaling, blurring, sharpening, thresholding, resizing, cropping, or a combination thereof, for example. The electronic device 102 utilizes the facial detection technique to determine whether low intensity regions of the decomposed frame include facial features. The facial features include eyebrows, eyes, a nose, lips, hairline, jawline, or a combination thereof, for example.

In other examples, the electronic device 102 utilizes a machine learning technique to detect the facial features, determine the angle of the user gaze, determine the user profile, or a combination thereof. The machine learning technique compares the facial features to multiple templates to determine that the features indicate a face, for example. In various examples, the electronic device 102 utilizes a machine learning technique that implements a convolution neural network (CNN) to determine whether the image includes a face. The CNN is trained with a training set that includes multiple images of multiple faces, for example. The multiple images include faces having different user profiles. Utilizing the trained CNN, the electronic device 102 identifies facial features of the image, classifies the facial features, and determines the central vertical axis of the face. The electronic device 102 utilizes the central axis of the face to determine the user profile.

In various examples, to determine the angle of the user gaze, the electronic device 102 identifies eye landmarks utilizing the facial detection techniques. The eye landmarks include outer corners, inner corners, irises, pupils, or a combination thereof. The electronic device 102 determines the angle of the user gaze relative to the reference point by utilizing a tracking technique (e.g., an eye tracking technique, a gaze tracking technique, or a combination thereof). For example, based on the locations of the eye landmarks relative to the reference point, the electronic device 102 determines a direction of the user gaze. In another example, the electronic device 102 causes the sensor 106 to emit an infrared light. The sensor 106 detects a reflection of the infrared light. The electronic device 102 analyzes data of the reflection to determine the angle of the user gaze.

In some examples, the user gaze switches from the display device 112 to the display device 104. In response to determining that the user 100 is intending to use the display device 104 based on the user gaze, the electronic device 102 causes the display device 104 to display the focus indicator 118. In other examples, the user 100 moves closer to the display device 112. In response to determining that the user 100 is closer in proximity to the display device 112, the electronic device 102 causes the display device 112 to display content of the display device 104. For example, the electronic device 102 replaces the GUIs 116 of the display device 112 with the GUI 114 of the display device 104. In some examples, the electronic device 102 replaces the GUI 114 of the display device 104 with the GUIs 116 of the display device 112.

In various examples, in response to the detection of the user 100 via a first sensor, the sensor 106, and to the detection of the user 100 via a second sensor (not explicitly shown) occurring simultaneously, the electronic device 102 determines a first proximity of the user 100 to the first sensor and a second proximity of the user 100 to the second sensor. Simultaneously, as used herein, indicates a period of time that is less than a specified time threshold. In response to the first proximity indicating that the user 100 is closer to the display device 104 than the display device 112, the electronic device 102 causes the display device 104 to display the focus indicator 118. In response to the second proximity indicating that the user 100 is closer to the display device 112 than the display device 104, the electronic device 102 causes the display device 112 to display the focus indicator 118, as shown in FIG. 1.

In some examples, utilizing a GUI of an executable code, the user 100 specifies the specified time threshold, display device placement within a location, or a combination thereof. In other examples, a manufacturer of the electronic device 102 specifies the specified time period. Executable code, as used herein, includes "applications," "software," and "firmware." "Applications," "software," and "firmware" are considered to be interchangeable in the context of the examples provided. "Firmware" is considered to be machine-readable instructions that a controller executes prior to execution of an operating system (OS), with a small portion that continues after the OS bootloader executes (e.g., a callback procedure), for example. "Applications" and "software" are considered broader terms than "firmware," and are considered to refer to machine-readable instructions that execute after the OS bootloader starts, through OS runtime, and until the electronic device (e.g., a peripheral device controlled by the firmware) shuts down, for example.

In various examples, utilizing the display device placement within the location, the electronic device 102 detects a presence of the user 100. The electronic device 102 determines whether a first distance between the user presence and a first display device is less than a second distance between the user presence and a second display device. For example, the electronic device 102 determines, via the sensor 106, a first distance from the display device 104 to the user 100 and a position of the user 100 relative to the display device 104. Utilizing a location of the display device 112 relative to the display device 104, the sensor 106, or a combination thereof, the distance, and the position, the electronic device 102 determines a second distance from the display device 112 to the user 100. In response to a determination that the first distance is less than the second distance, the electronic device 102 causes the display device 104 to display the focus indicator 118. In response to a determination that the second distance is less than the first distance, the electronic device 102 causes the display device 112 to display the focus indicator 118.

In other examples, the display device placement includes a grid layout of the location. The grid layout may be a two-dimensional (2D) or a three-dimensional (3D) representation of the location. A first display device is disposed within a first box of the grid layout, and a second display device is disposed within a second box of the grid layout, for example. In another example, the first display device is disposed where a first line and a second line of the grid layout intersect, or at a first grid coordinate, and the second display device is disposed at a second grid coordinate. The electronic device 102 determines whether a location of the user 100 within the grid layout. The electronic device 102 determines a first distance between the user 100 and the first display device utilizing the grid layout. For example, the electronic device 102 determines that the user 100 is two boxes of the grid layout from the display device 104. The electronic device 102 determines a first distance between the user 100 and the first display device utilizing the grid layout. For example, the electronic device 102 determines that the user 100 is three boxes of the grid layout from the display device 112. In response to a determination that the user 100 is closer to the display device 104, the electronic device 102 causes the display device 104 to display the focus indicator 118. In response to a determination that the user is closer to the display device 112, the electronic device 102 causes the display device 112 to display the focus indicator 118.

Figure 2:
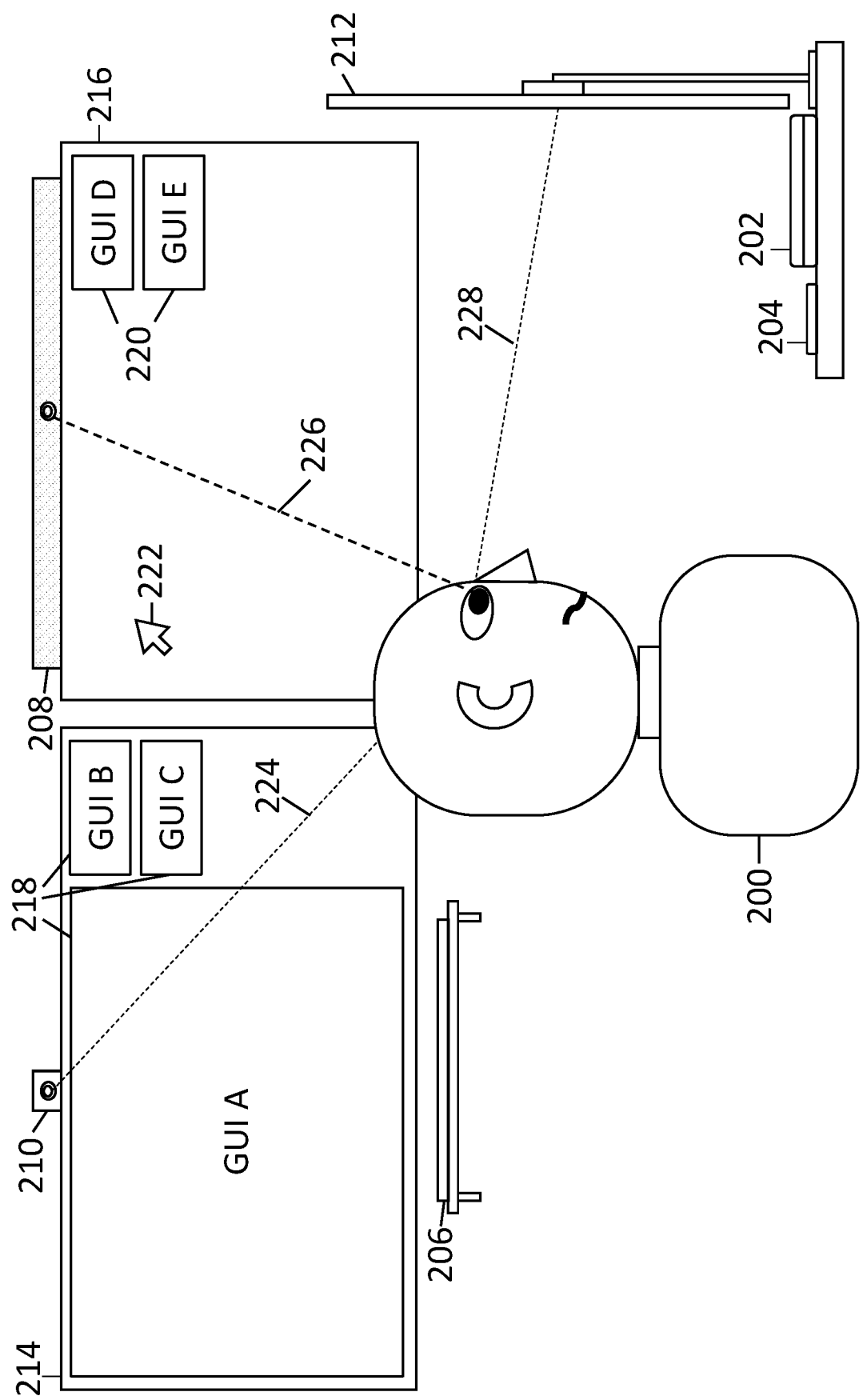
FIG. 2 is a block diagram of an electronic device for adjusting a display of a focus indicator on display devices, in accordance with various examples.

Referring now to FIG. 2, a block diagram of an electronic device 202 for adjusting display of a focus indicator 222 on display devices 212, 214, 216 is shown, in accordance with various examples. The electronic device 202 is the electronic device 102, for example. The focus indicator 222 is the focus indicator 118, for example. The display devices 212, 214, 216 are standalone display devices, as described above with respect to FIG. 1, for example. The electronic device 202 includes input device 204, 206, an input/output (I/O) device 208, a sensor 210, and the display devices 212, 214, 216. An input device 204 is a drawing tablet, for example. An input device 206 is a keyboard, for example. The input device 206 is associated with the display device 214, for example. The I/O device 208 is a soundbar that includes speakers and an image sensor, for example. The sensor 210 is an image sensor, for example. The display device 214 displays GUIs 218. The display device 216 displays GUIs 220. The user reference 224 indicates the distance between the user 200 and the display device 214, an angle of the user gaze relative to the display device 214, a user profile relative to the display device 214, or a combination thereof. The user reference 226 indicates the distance between the user 200 and the display device 216, an angle of the user gaze relative to the display device 216, a user profile relative to the display device 216, or a combination thereof. The user reference 228 indicates the distance between the user 200 and the display device 212, an angle of the user gaze relative to the display device 212, a user profile relative to the display device 212, or a combination thereof.

As described above, the electronic device 202 detects the user 200 in proximity to the display devices 212, 214, 216. The electronic device 202 detects the user 200 via the I/O device 208, the sensor 210, or a combination thereof, for example. In another example, the electronic device 202 utilizes the sensor 210 to detect the user 200 in proximity to the display device 214, utilizes the I/O device 208 to detect the user 200 in proximity to the display device 216, and utilizes another sensor (not explicitly shown) to detect the user 200 in proximity to the display device 212. The another sensor is an integrated sensor (not explicitly shown) of the display device 212, for example. In response to the electronic device 202 determining that the user 200 intends to use a particular display device of the display devices 212, 214, 216, the electronic device 202 causes the particular display device to display the focus indicator 222.

In various examples, the electronic device 202 is a laptop having an integrated display device. When the laptop is in a closed position, as shown in FIG. 2, the electronic device 202 determines which of the display devices 212, 214, 216 the user 200 is intending to use. In some examples, the electronic device 202 determines which display device of the display devices 212, 214, 216 that the user 200 is intending to use using distances to the display devices 212, 214, 216 from the user 200, a user gaze relative to the display devices 212, 214, 216, respectively, a user profile relative to the display devices 212, 214, 216, respectively, or a combination thereof. The electronic device 202 determines the distances, the user gaze, the user profile, or the combination thereof, utilizing the techniques described above with respect to FIG. 1, for example.

In other examples, the laptop adjusting from the closed position to the opened position causes the electronic device 202 to determine that the user 200 intends to use the display device integrated into the electronic device 202. In response to determining that the user 200 is intending to use the integrated display device, the electronic device 202 causes the integrated display device to display the focus indicator 222. In some examples, the electronic device 202 causes content of the display device 216 to display on the integrated display device. For example, the electronic device 202 causes the integrated display device to display the GUIs 220 of the display device 216.

In some examples, the electronic device 202 includes a display configuration stored to a storage device of the electronic device 202. For example, the display configuration stores a first display device as a display device having the focus indicator 222 and a second display device as a display device having inactive components. In a first location having the first display device and the second display device coupled to the electronic device 202 according to a first order, the first display device includes the focus indicator 222. In a second location having the first display device and the second display device coupled to the electronic device 202 according to a second order, the second display device includes the focus indicator 222. The electronic device 202 determines which display device the user is intending to utilize and adjusts the focus indicator 222 to that display device. Utilizing user intent, the electronic device 202 enhances the user experience by adjusting the focus indicator 222 regardless of the display configuration stored to the electronic device 202.

In various examples, the electronic device 202, in response to the detection of the user presence via the sensor 210, the electronic device 202 enables the input device 206 associated with the display device 214. In response to the detection of the user presence via a sensor (not explicitly shown) of the display device 212, the electronic device 202 enables the input device 204 associated with the display device 212.

In some examples, in response to the detection of the user presence via the sensor 210, the electronic device 202 adjusts settings of the display device 214. The settings include whether the display device 214 is enabled/disabled, an intensity, a color format, a sharpness, a language, a transparency, a rotation, a dimension, an aspect ratio, a refresh rate, or a combination thereof. For example, in response to the detection of the user presence via the sensor 210, the electronic device 202 enables the display device 214 and increases a refresh rate of the display device 214. In various examples, in response to the detection of the user presence via the sensor 210, the electronic device 202 adjusts settings of the display device 212, 216. For example, in response to the detection of the user presence via the sensor 210, the electronic device 202 disables the display devices 212, 216.

Figure 3:
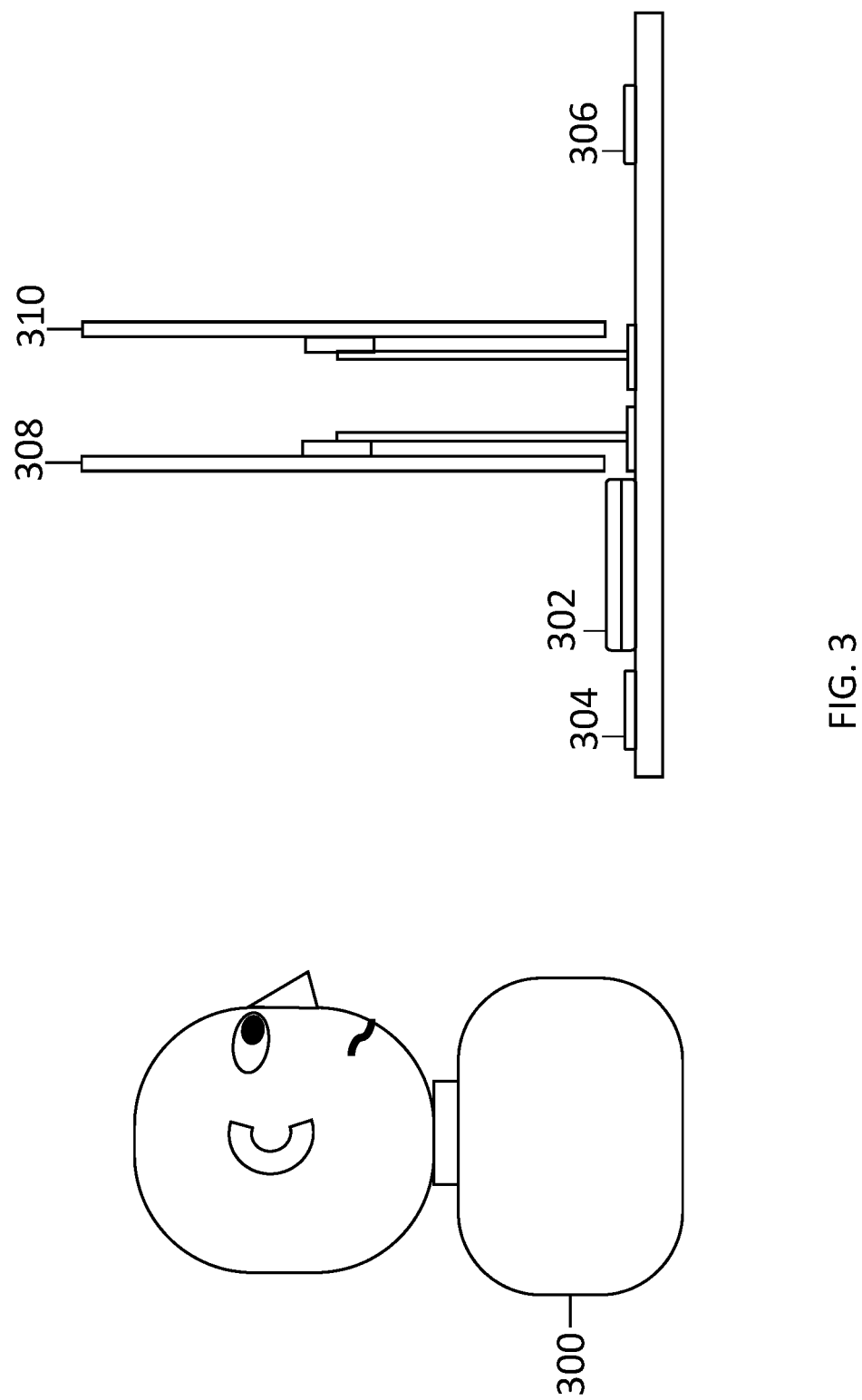
FIG. 3 is a block diagram of an electronic device for adjusting a display of a focus indicator on display devices, in accordance with various examples.

Referring now to FIG. 3, a block diagram of an electronic device 302 for adjusting display of a focus indicator on display devices 308, 310 is shown, in accordance with various examples. The electronic device 302 is the electronic device 102, 202, for example. The focus indicator (not explicitly shown) is the focus indicator 118, 222, for example. The display devices 308, 310, are standalone display devices, as described above with respect to FIG. 1, for example. The electronic device 302 includes input device 304, 306 and the display devices 308, 310. An input device 304 is a keyboard, for example. An input device 306 is a keyboard, for example.

In some examples, the electronic device 302 includes a first display device, the display device 308, including a first sensor (not explicitly shown) and a second display device, the display device 310, including a second sensor (not explicitly shown). In response to a detection of a presence of a user 300 via the first sensor, the electronic device 302 causes the first display device to display a focus indicator. In response to a detection of the presence of the user 300 via the second sensor, the electronic device 302 causes the second display device to display the focus indicator. In various examples, in response to the detection of the user presence via the first sensor, the electronic device 302 enables a first input device, the input device 304, associated with the first display device. In response to the detection of the user presence via the second sensor, the electronic device 302 enables a second input device, the input device 306, associated with the second display device. In other examples, in response to the detection of the user presence via the first sensor, the electronic device 302 adjusts settings of the first display device and the second display device.

The electronic device 102, 202, 302 adjusting the focus indicator 118, 222 between multiple display devices (e.g., the display devices 104, 112, 212, 214, 216, 308, 310) in response to an indication that the user 100, 200, 300 intends to use a particular display device enables the user 100, 200, 300 to move between the multiple display devices without tracking the focus indicator 118, 222. By adjusting the input device 108, 110, 204, 206, 304, 306, which display device of the multiple display devices displays the focus indicator 118, 222, settings of the display device including the focus indicator 118, 222, settings of another display device of the multiple display devices, or the combination thereof, in response to user intent, the electronic device 102, 202, 302 enhances the user experience. In some examples, adjusting the settings of the another display device reduces power consumption of the electronic device 102, 202, 302. In other examples, adjusting the settings of the another display device reallocates resources to enhance activities associated with the display device including the focus indicator 118, 222.

Figure 4:
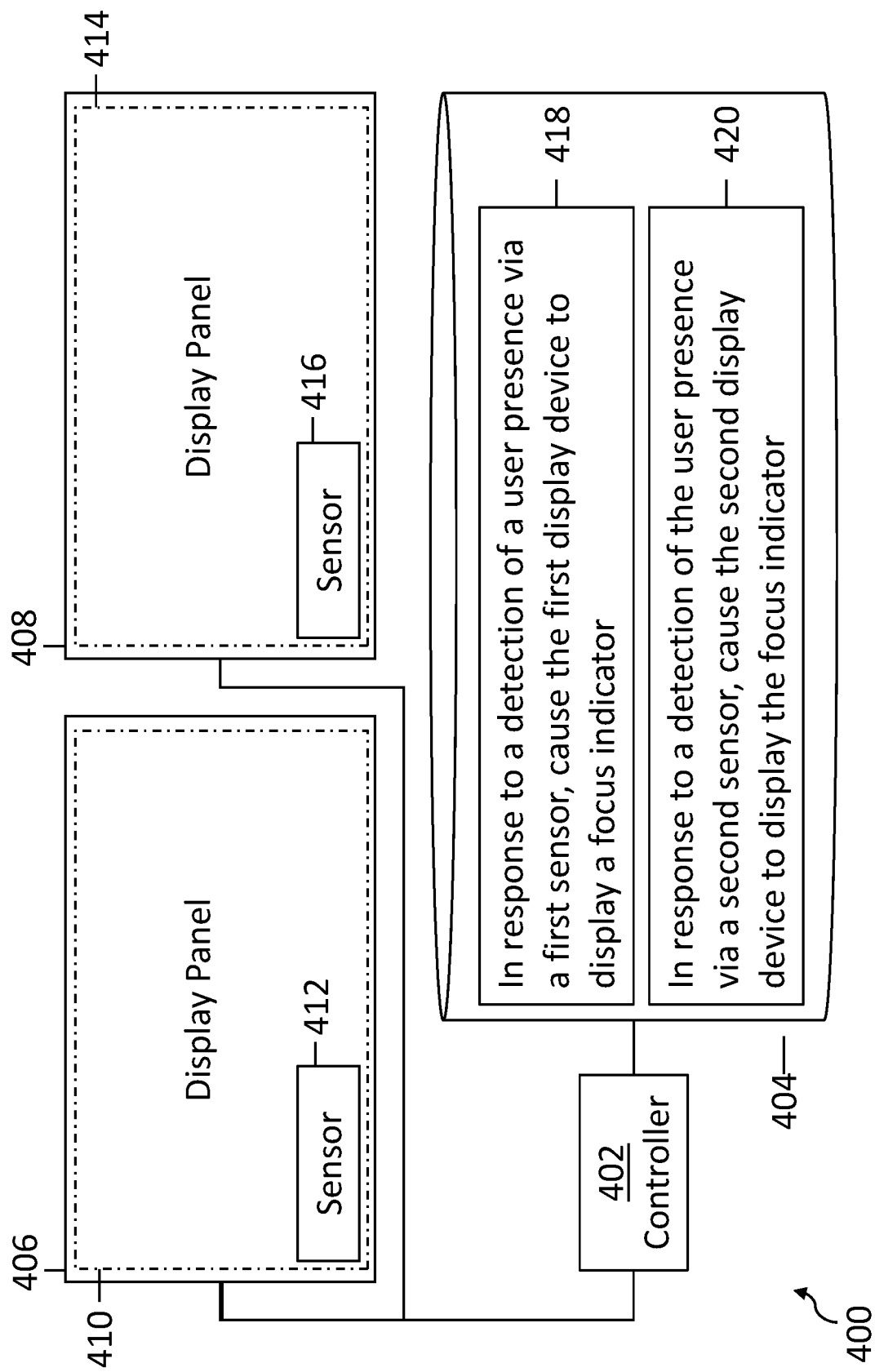
FIG. 4 is a block diagram of an electronic device for adjusting a display of a focus indicator on display devices, in accordance with various examples.

Referring now to FIG. 4, a block diagram of an electronic device 400 for adjusting display of a focus indicator on display devices 406, 408 is shown, in accordance with various examples. The electronic device 400 is the electronic device 102, 202, 302, for example. The focus indicator is the focus indicator 118, 222, for example. The electronic device 400 includes a controller 402, a storage device 404, and display devices 406, 408. The controller 402 is a microcontroller, a microcomputer, a programmable integrated circuit, a programmable gate array, or other suitable device for managing operations of the electronic device 400 or a component or multiple components of the electronic device 400. For example, the controller 402 is a central processing unit (CPU), a graphics processing unit (GPU), or an embedded security controller (EpSC). In another example, the controller 402 is an embedded artificial intelligence (eAI) of a network interface (not explicitly shown). The storage device 404 is a hard drive, a solid-state drive (SSD), flash memory, random access memory (RAM), or other suitable memory for storing data or machine-readable instructions of the electronic device 400. The display device 406 includes a display panel 410 and a sensor 412. The display device 408 includes a display panel 414 and a sensor 416.

While not explicitly shown, in some examples, the electronic device 400 includes network interfaces, video adapters, sound cards, local buses, peripheral devices (e.g., a keyboard, a mouse, a touchpad, a speaker, a microphone), or a combination thereof. While the sensors 412, 416 are shown as integrated sensors of the display devices 406, 408, respectively, in other examples, the sensors 412, 416 couple to any suitable connection for enabling communications between the display devices 406, 408 and the sensors 412, 416, respectively. The connection may be via a wired connection (e.g., a Universal Serial Bus (USB)) or via a wireless connection (e.g., BLUETOOTH®, Wi-Fi®). While the display devices 406, 408 are shown as coupled to the electronic device 400 via a wired connection (e.g., USB, a High-Definition Multimedia Interface (HDMI) connector, a Video Graphics Array (VGA) connector, a Digital Visual Interface (DVI)), in other examples, the display devices 406, 408 are coupled to the electronic device 400 via a wireless connection (e.g., BLUETOOTH®, Wi-Fi®).

In various examples, the controller 402 is coupled to the storage device 404, the display device 406, and the display device 408. In some examples, the storage device 404 stores machine-readable instructions 418, 420, which, when executed by the controller 402, cause the controller 402 to perform some or all of the actions attributed herein to the controller 402.

In some examples, the machine-readable instructions 418, 420, when executed by the controller 402, cause the controller 402 to adjust display of a focus indicator on the display devices 406, 408 coupled to the electronic device 400. In response to a detection of a user presence via a first sensor, the machine-readable instruction 418, when executed by the controller 402, causes the controller 402 to cause a first display device to display a focus indicator. In response to a detection of a user presence via a second sensor, the machine-readable instruction 420, when executed by the controller 402, causes the controller 402 to cause a second display device to display the focus indicator.

As described above, in various examples, the controller 402 detects a user presence in proximity to the display devices 406, 408. The controller 402 detects the user presence via the sensors 412, 416, an input device (e.g., the input device 108, 110, 204, 206, 304, 306, the I/O device 208), or a combination thereof, for example. In response to detecting the user presence, the controller 402 determines whether the user (e.g., the user 100, 200, 300) intends to use a particular display device of the display devices 406, 408. In some examples, the controller 402 uses a distance, a user gaze, a user profile, or a combination thereof, using the techniques described above with respect to FIG. 1, to determine whether the user intends to use the particular display device. In response to the controller 402 determining that the user intends to use the particular display device, the controller 402 causes the particular display device to display the focus indicator. In some examples, the controller 402 enables an input device associated with the display device displaying the focus indicator, adjusts settings of the display device displaying the focus indicator, adjusts settings of another display device of the multiple display devices, or a combination thereof.

Figure 5:
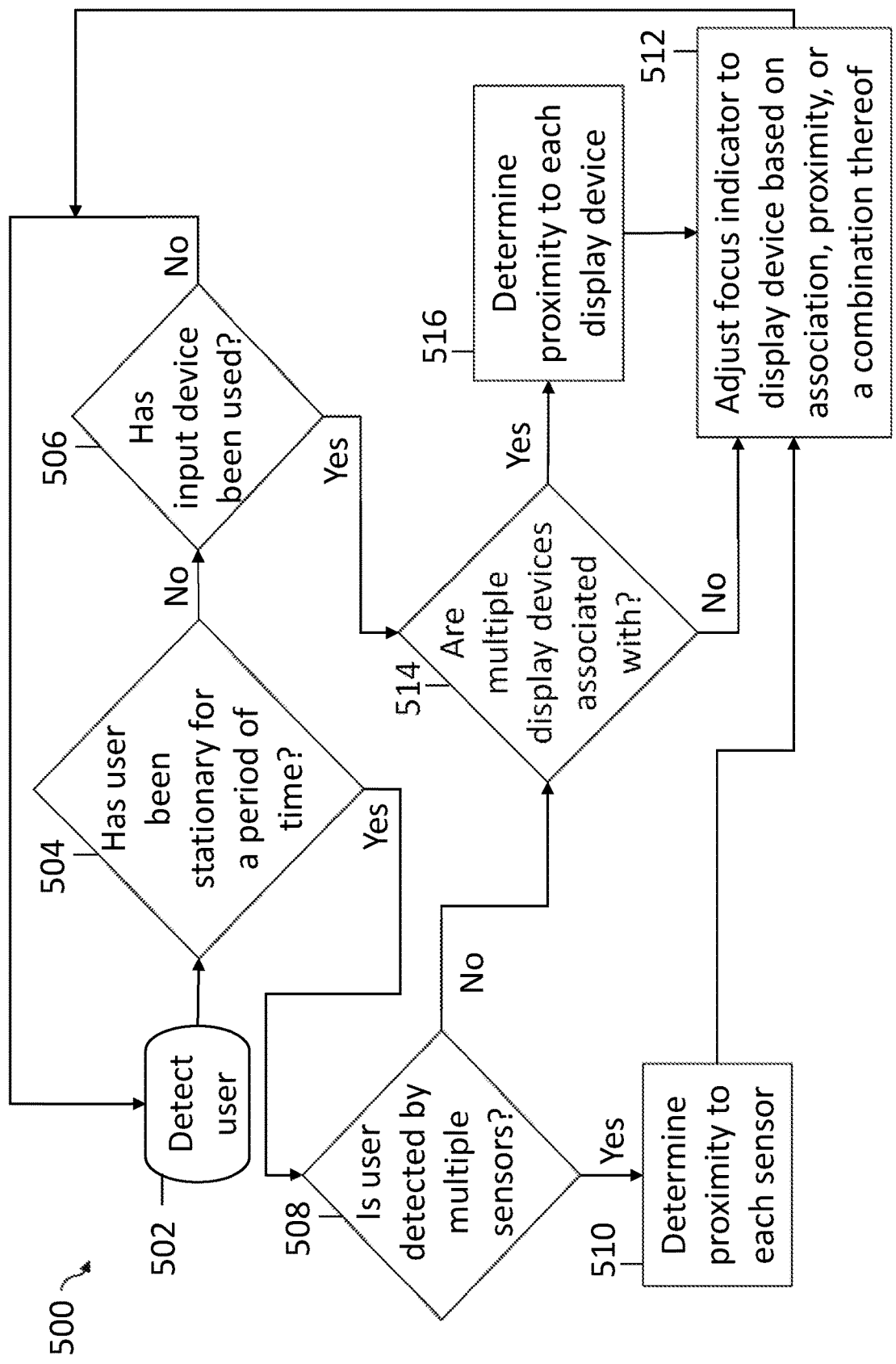
FIG. 5 is a flow diagram of a method for an electronic device for adjusting a display of a focus indicator on display devices, in accordance with various examples.

Referring now to FIG. 5, a flow diagram of a method 500 for an electronic device (e.g., the electronic device 102, 202, 302, 400) for adjusting display of a focus indicator (e.g., the focus indicator 118, 222) on display devices (e.g., the display devices 104, 112, 212, 214, 216, 308, 310) is shown, in accordance with various examples. In various examples, the method 500 starts in response to detecting a user (502). The user is the user 100, 200, 300, for example. The method 500 also includes determining whether the user has been stationary for a period of time (504). In response to a determination that the user has not been stationary for the period of time, the method 500 includes determining whether an input device has been used (506). In response to a determination that the input device has not been used, the method 500 returns to detecting a user (502).

In response to a determination that the user has been stationary for the period of time, the method 500 includes determining whether the user is detected by multiple sensors (508). In response to a determination that the user is detected by multiple sensors, the method 500 also includes determining a proximity of the user to the multiple sensors (510). Additionally, the method 500 includes adjusting the focus indicator to a display device based on an association, the proximity, or a combination thereof (512). The method 500 returns to detecting the user (502).

In response to a determination that the user is not detected by multiple sensors, the method 500 includes determining whether multiple display devices are associated with the device that has detected the user (514). In response to a determination that multiple display devices are not associated with the device that detected the user, the method 500 adjusts the focus indicator to the display device based on the association, the proximity, or a combination thereof (512). The method 500 returns to detecting the user (502).

In response to a determination that the user is detected by multiple sensors, the method 500 includes determining a proximity of the user to each display device of the multiple display devices (516). Additionally, the method 500 includes adjusting the focus indicator to a display device based on an association, the proximity, or a combination thereof (512). The method 500 returns to detecting the user (502).

In response to a determination that the input device has been used, the method 500 includes determining whether multiple display devices are associated with the device that has detected the user (514). In response to a determination that multiple display devices are not associated with the device that detected the user, the method 500 adjusts the focus indicator to the display device based on an association, the proximity, or a combination thereof (512). The method 500 returns to detecting the user (502).

In various examples, the method 500 includes detecting the user via a sensor (e.g., the sensor 106, 210, 412, 416), an input device (e.g., the input device 108, 110, 204, 206, 304, 306, the I/O device 208), or a combination thereof. The electronic device detects the user via the sensor, the input device, or the combination thereof, using the techniques described above with respect to FIG. 1, 2, or 3, for example. In some examples, in response to detecting the user via the sensor, the method 500 includes determining whether the user has been stationary for a period of time that is greater than a stationary threshold. As described above with respect to FIG. 1, the stationary threshold is set by the user utilizing the GUI of an executable code, a manufacturer of the electronic device, or a combination thereof. In response to a determination that the user has not been stationary for the period of time, the method 500 includes returning to detecting the user until a determination that the user has been stationary for the period of time that is greater than the stationary threshold, or until the user utilizes an input device. In some examples, the method 500 additionally includes determining whether the user utilizes the input device for a period of time that is greater than the stationary threshold.

In other examples, the method 500 includes determining whether the user is detected by multiple sensors, as described above with respect to FIG. 1, 2, or 3. In response to a determination that the user is detected by multiple sensors, the method 500 includes determining a proximity of the user to the multiple sensors utilizing the techniques described above with respect to FIG. 1, 2, or 3. In various examples, the method 500 includes determining a user intent based on distances from the user to the multiple sensors, the user gaze, the user profile, or a combination thereof and adjusting the focus indicator to a display device based on the user intent.

In some examples, in response to a determination that the input device has been used, the method 500 includes determining whether multiple display devices are associated with the input device. In response to a determination that multiple display devices are associated with the input device, the method 500 additionally includes using the sensor to determine proximities of the user to the multiple display devices associated with the input device.

Figure 6:
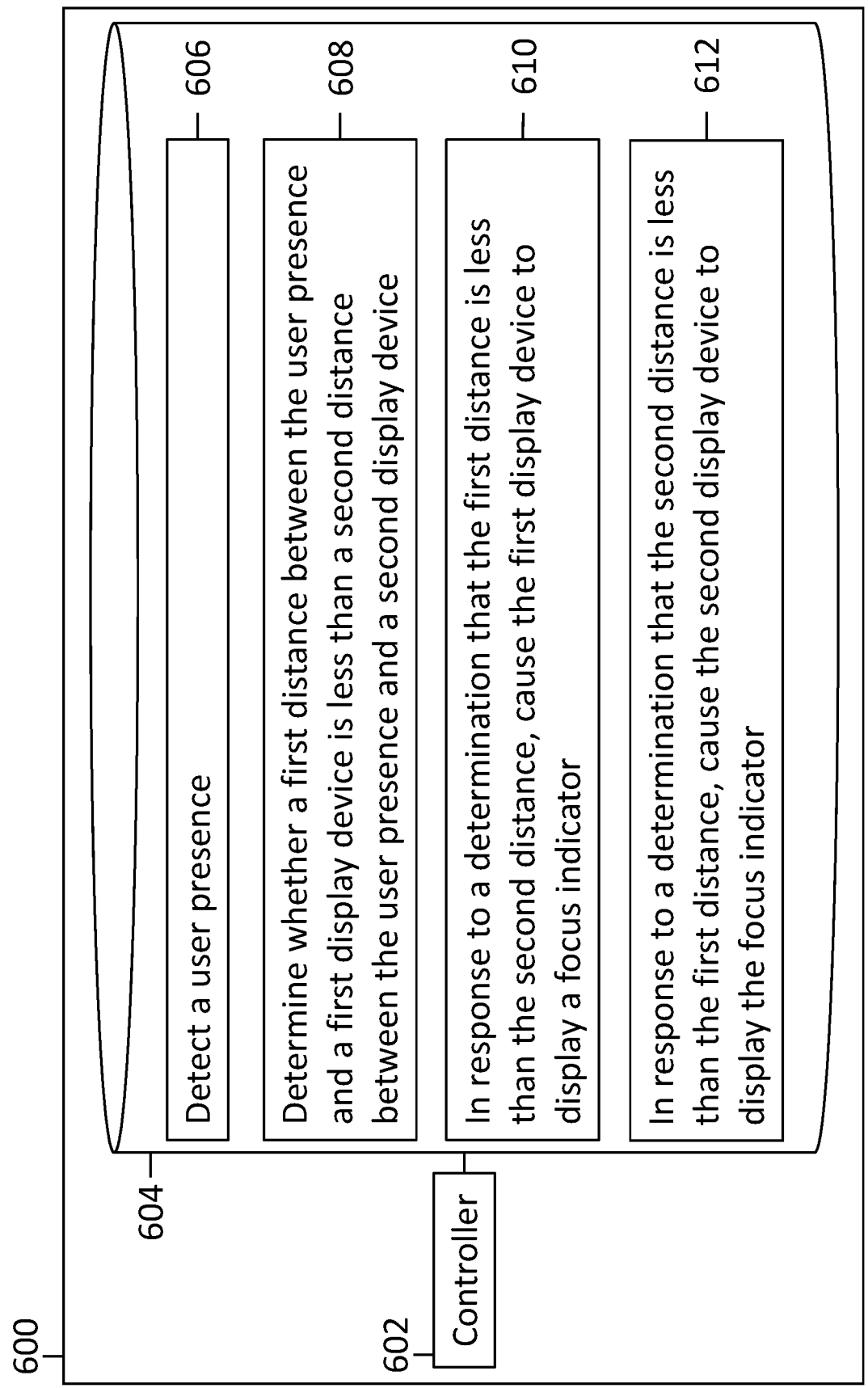
FIG. 6 is a block diagram of an electronic device for adjusting a display of a focus indicator on display devices, in accordance with various examples.

Referring now to FIG. 6, a block diagram of an electronic device 600 for adjusting display of a focus indicator (e.g., the focus indicator 118, 222) on display devices (e.g., the display devices 104, 112, 212, 214, 216, 308, 310) is shown, in accordance with various examples. The electronic device 600 is the electronic device 102, 202, 302, 400, for example. The electronic device 600 includes a controller 602 and a non-transitory machine-readable medium 604. The controller 602 is the controller 402, for example. The non-transitory machine-readable medium 604 is the storage device 404, for example.

In some examples, the controller 602 is coupled to the non-transitory machine-readable medium 604. In various examples, the non-transitory machine-readable medium 604 stores machine-readable instructions, which, when executed by the controller 602, cause the controller 602 to perform some or all of the actions attributed herein to the controller 602. The machine-readable instructions are the machine-readable instructions 606, 608, 610, 612.

In various examples, the machine-readable instructions 606, 608, 610, 612, when executed by the controller 602, cause the controller 602 to adjust display of a focus indicator on the display devices coupled to the electronic device 600. The machine-readable instruction 606, when executed by the controller 602, causes the controller 602 to detect a user presence. The machine-readable instruction 608, when executed by the controller 602, causes the controller 602 to determine whether a first distance between the user presence and a first display device is less than a second distance between the user presence and a second display device. In response to a determination that the first distance is less than the second distance, the machine-readable instruction 610, when executed by the controller 602, causes the controller 602 to cause the first display device to display a focus indicator. In response to a determination that the second distance is less than the first distance, the machine-readable instruction 612, when executed by the controller 602, causes the controller 602 to cause the second display device to display the focus indicator.

In some examples, the machine-readable instruction 606, when executed by the controller 602, causes the controller 602 to detect the user presence via input received via an input device (e.g., the input device 108, 110, 204, 206, 304, 306, the I/O device 208). In response to a determination that the input device is associated with the first display device, the controller 602 determines that the first distance is less than the second distance. In response to a determination that the input device is associated with the second display device, the controller 602 determines that the second distance is less than the first distance.

In other examples, the machine-readable instruction 606, when executed by the controller 602, causes the controller 602 to detect the user presence via an image sensor (e.g., the sensor 106, 210, the I/O device 208). The controller 602 determines the first distance and the second distance utilizing an image captured via the image sensor, as described above with respect to FIG. 1, 2, or 3, for example.

In some examples, in response to detecting the user presence via a first sensor associated with the first display device, the controller 602 enables a timer. In response to detecting the user presence via a second sensor associated with the second display device and a value of the timer being less than a threshold, the controller 602 resets the timer. The threshold is a stationary threshold, as described above with respect to FIG. 5, for example. In response to detecting the user presence via the second sensor and the value of the timer being equivalent to or greater than the threshold, the controller 602 causes the second display device to display the focus indicator. In various examples, the controller 602 determines whether the second distance between the user presence and the second display device is less than a third distance between the user presence and a third display device associated with the second sensor. In response to a determination that the second distance is less than the third distance, the controller 602 causes the second display device to display the focus indicator. In response to a determination that the third distance is less than the second distance, the controller 602 causes the third display device to display the focus indicator.

Figure 7:
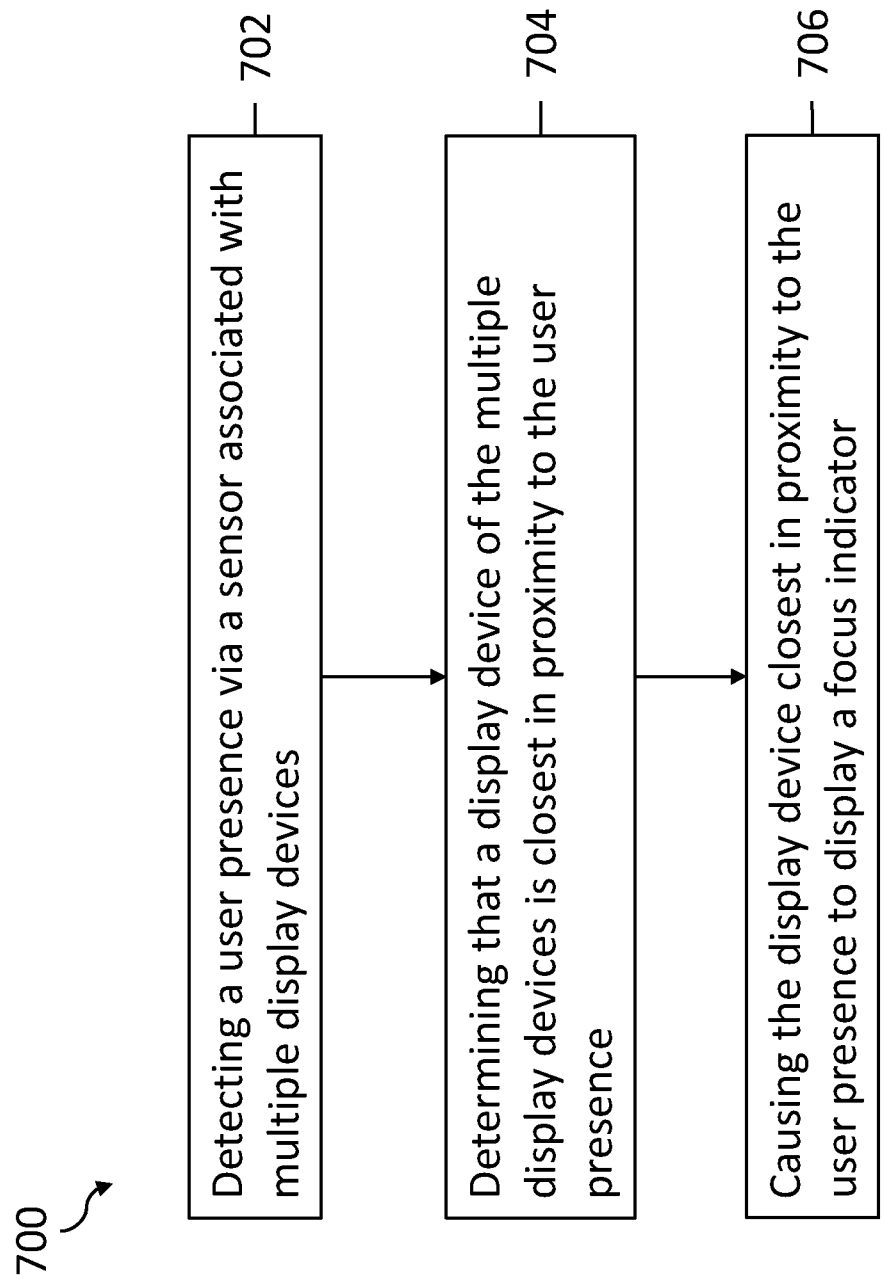
FIG. 7 is a flow diagram of a method for an electronic device for adjusting a display of a focus indicator on display devices, in accordance with various examples.

Referring now to FIG. 7, a flow diagram of a method 700 for an electronic device (e.g., the electronic device 102, 202, 302, 400, 600) for adjusting display of a focus indicator (e.g., the focus indicator 118, 222) on display devices (e.g., the display devices 104, 112, 212, 214, 216, 308, 310) is shown, in accordance with various examples. The method 700 includes detecting a user presence via a sensor associated with multiple display devices (702). The method 700 also includes determining that a display device of the multiple display devices is closest in proximity to the user presence (704). Additionally, the method 700 includes causing the display device closest in proximity to the user presence to display the focus indicator (706).

In some examples, the method 700 includes enabling an input device associated with the display device displaying the focus indicator, adjusting settings of the display device displaying the focus indicator, adjusting settings of another display device of the multiple display devices, or a combination thereof. For example, the method 700 includes enabling the input device associated with the display device displaying the focus indicator and disabling an input device associated with the display device that previously displayed the focus indicator. In another example, the method 700 includes increasing a brightness setting of the display device displaying the focus indicator and decreasing a brightness setting of the display device that previously displayed the focus indicator. By decreasing the brightness setting of the display device that previously displayed the focus indicator, the method 700 reduces a power consumption of that display device.

Unless infeasible, some or all of the method 500, 700 may be performed by a controller (e.g., the controller 402, 602) concurrently or in different sequences and by circuitry of an electronic device (e.g., the electronic device 102, 202, 302, 400, 600), execution of machine-readable instructions of the electronic device (e.g., the machine-readable instructions 418, 420, 606, 608, 610, 612), or a combination thereof. For example, the method 500, 700 is implemented by machine-readable instructions stored to a storage device (e.g., the storage device 404, the non-transitory machine-readable medium 604, or another storage device not explicitly shown of the electronic device), circuitry (some of which is not explicitly shown) of the electronic device, or a combination thereof. The controller executes the machine-readable instructions to perform some or all of the method 500, 700, for example.

The electronic device performing the method 500, 700 to adjust display of the focus indicator between multiple display devices in response to a user presence enables the user 100, 200, 300 to move between the multiple display devices without tracking the focus indicator. By adjusting the input device, which display device of the multiple display devices displays the focus indicator, settings of the display device including the focus indicator, settings of another display device of the multiple display devices, or the combination thereof, in response to user presence, the electronic device performing the method 500, 700 enhances the user experience.

While some components are shown as separate components of the electronic device 102, 202, 302, 400, 600, in other examples, the separate components are integrated in a single package. For example, the storage device 404 is integrated with the controller 402. In another example, the non-transitory machine-readable medium 604 is integrated with the controller 602. The single package may herein be referred to as an integrated circuit (IC) or an integrated chip (IC). While the sensor 106, 210, 412, 416 are referred to as sensors, the sensors 106, 210, 412, 416 are also input devices that receive data to determine proximities, distances, user gaze, user profile, or a combination thereof.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component are omitted.

In the above description and in the claims, the term "comprising" is used in an open-ended fashion, and thus should be interpreted to mean "including, but not limited to . . . " Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An electronic device, comprising:
  a first display device including a first sensor and a second display device including a second sensor; and
  a controller to:
    in response to a detection of a user presence via the first sensor, cause the first display device to display a focus indicator and enable a first input device associated with the first display device; and
    in response to a detection of the user presence via the second sensor, cause the second display device to display the focus indicator and enable a second input device associated with the second display device.

2. The electronic device of claim 1, wherein in response to the detection of the user presence via the first sensor and to the detection of the user presence via the second sensor occurring simultaneously, the controller is to:
  determine a first proximity of the user presence to the first sensor and a second proximity of the user presence to the second sensor;
  in response to the first proximity indicating that the user presence is closer to the first display device than the second display device, cause the first display device to display the focus indicator and enable the first input device; and
  in response to the second proximity indicating that the user presence is closer to the second display device than the first display device, cause the second display device to display the focus indicator and enable the second input device.

3. The electronic device of claim 1, wherein in response to the detection of the user presence via the first sensor, the controller is to adjust settings of the first display device.

4. The electronic device of claim 3, wherein in response to the detection of the user presence via the first sensor, the controller is to adjust settings of the second display device.

5. A method, comprising:
  detecting a user presence via a sensor associated with multiple display devices;
  determining that a display device of the multiple display devices is closest in proximity to the user presence;
  causing the display device that is closest in proximity to the user presence to display a focus indicator; and
  enabling an input device that is associated with the display device that is closest in proximity to the user presence.

6. The method of claim 5, comprising causing the display device that is closest in proximity to the user presence to display content of a previous display device that was closest in proximity to the user presence.

7. The method of claim 5, comprising determining proximities between the user presence and the multiple display devices via the sensor.

8. The method of claim 7, wherein the sensor is an image sensor, and comprising:
  determining that a user gaze, a percentage of the user face that is viewable, or a combination thereof, indicates that a second display device of the multiple display devices is intended to be used by a user; and
  in response to the determination that the second display device is intended to be used by the user, causing the second display device to display the focus indicator and enabling a second input device that is associated with the second display device.

9. The method of claim 7, comprising:
  determining that a user gaze, a percentage of the user face that is viewable, or a combination thereof, indicates that a second display device of the multiple display devices is intended to be used by a user by comparing grid coordinates of peaks of a value of an electronic signal received via the sensor to reference grid coordinates of the multiple display devices; and
  in response to the determination that the second display device is intended to be used by the user, causing the second display device to display the focus indicator and enabling a second input device that is associated with the second display device.

10. A non-transitory machine-readable medium storing machine-readable instructions, which, when executed by a controller, cause the controller to:
  detect a user presence;
  determine whether a first distance between the user presence and a first display device is less than a second distance between the user presence and a second display device;
  in response to a determination that the first distance is less than the second distance, cause the first display device to display a focus indicator and enable a first input device that is associated with the first display device; and
  in response to a determination that the second distance is less than the first distance, cause the second display device to display the focus indicator and enable a second input device that is associated with the second display device.

11. The non-transitory machine-readable medium of claim 10, wherein the machine-readable instructions, when executed by the controller, cause the controller to:
  detect the user presence via input received via a triggered input device;
  in response to a determination that the triggered input device is the first input device, determine that the first distance is less than the second distance; and
  in response to a determination that the triggered input device is the second input device, determine that the second distance is less than the first distance.

12. The non-transitory machine-readable medium of claim 10, wherein the machine-readable instructions, when executed by the controller, cause the controller to:
  detect the user presence via an image sensor; and
  determine the first distance and the second distance utilizing an image captured via the image sensor.

13. The non-transitory machine-readable medium of claim 10, wherein the machine-readable instructions, when executed by the controller, cause the controller to:
  in response to detecting the user presence via a first sensor associated with the first display device, enable a timer;
  in response to detecting the user presence via a second sensor associated with the second display device and a value of the timer being less than a threshold, reset the timer; and
  in response to detecting the user presence via the second sensor and the value of the timer being equivalent to or greater than the threshold, cause the second display device to display the focus indicator.

14. The non-transitory machine-readable medium of claim 13, wherein the machine-readable instructions, when executed by the controller, cause the controller to:
  determine whether the second distance between the user presence and the second display device is less than a third distance between the user presence and a third display device associated with the second sensor;
  in response to a determination that the second distance is less than the third distance, cause the second display device to display the focus indicator; and
  in response to a determination that the third distance is less than the second distance, cause the third display device to display the focus indicator.

15. The electronic device of claim 1, wherein
  the first sensor is an infrared sensor, a presence sensor, a proximity sensor, an ultrasonic sensor, or an image sensor, and
  the second sensor is an infrared sensor, a presence sensor, a proximity sensor, an ultrasonic sensor, or an image sensor.

16. The electronic device of claim 1, wherein the first sensor is an integrated sensor of the first display device and the second sensor is an integrated sensor of the second display device.

17. The method of claim 6, wherein the focus indicator identifies a display device of the multiple display devices that is affected by input from the input device.

18. The method of claim 6, further comprising determining whether a user corresponding to the user presence has been stationary for a period of time.

19. The non-transitory machine-readable medium of claim 10, wherein the machine-readable instructions, when executed by the controller, cause the controller to:
  in response to the determination that the first distance is less than the second distance, adjust a setting of at least one of the first display device or the second display device.

20. The non-transitory machine-readable medium of claim 19, wherein the machine-readable instructions, when executed by the controller, cause the controller to adjust the setting of at least one of the first display device or the second display device by:
  increasing a brightness setting of the first display device; and
  decreasing a brightness setting of the second display device.

* * * * *